June 13, 1961 E. P. STABLER 2,988,649

MAGNETIC LOGIC CIRCUITS EMPLOYING MAGNETIC RELAY COMPONENTS

Filed March 2, 1960

INVENTOR:
EDWARD P. STABLER,
BY Marvin A. Goldenberg
HIS ATTORNEY.

United States Patent Office 2,988,649

Patented June 13, 1961

2,988,649

MAGNETIC LOGIC CIRCUITS EMPLOYING MAGNETIC RELAY COMPONENTS

Edward P. Stabler, North Syracuse, N.Y., assignor to General Electric Company, a corporation of New York Filed Mar. 2, 1960, Ser. No. 12,332
9 Claims. (Cl. 307—88)

The invention relates to novel magnetic networks for performing logical switching operations. More particularly, the invention relates to a novel magnetic relay component and to applications thereof in performing numerous binary logical operations.

Logical switching functions have been performed in the past by continuous magnetic core constructions wherein flux coupling takes place along magnetic paths. Some of these known magnetic core logic circuits, which perform various logical operations, such as AND-OR gate functions, odd parity checking and half adding, have been described in an article by H. W. Abbott and J. J. Suran entitled, "Multihole Ferrite Core Configurations and Applications," appearing in the Proceedings of the IRE, August 1957, and in an article by N. F. Lockhart entitled "Logic by Ordered Flux Changes in Multipath Ferrite Cores," appearing in the 1958 IRE National Convention Record, part 4. These known magnetic core networks are conventionally constructed of a unitary core member either of a rectangular configuration having a plurality of transverse legs coupled together by a pair of longitudinal legs, or of circular construction having a plurality of apertures. Each configuration is specific as to the type and number of logical operations that can be performed.

Applicant has discovered a novel, fundamental form of magnetic core structure which is the analogue of an electrical relay circuit. It is well known that electrical relay circuits perform the basic functions of all binary logic operations, and that any simple or complex binary longical operation can be accomplished by the proper connections of a plurality of relays. Correspondingly, by the proper combination of applicant's magnetic relay elements, there can be performed any complex binary logical operation capable of performance by electrical relay circuits, limited only by the properties of the magnetic material, with the attendant advantages of magnetic circuitry. These advantages include inexpensive fabrication, reliability, ruggedness, fewer components and small power requirements, among others. A few of the more rudimentary magnetic networks devised by applicant from his magnetic relay elements are presented here.

It is therefore an object of the invention to provide a novel magnetic element which can be employed in combination to readily provide numerous logical operations.

It is a further object of the invention to provide a novel magnetic element which is the analogue of an electrical relay circuit.

It is a more specific object of the invention to provide a novel magnetic relay element which is coupled in combination to provide a novel magnetic logic tree having a plurality of disjoint outputs which respond to various combinations of a plurality of inputs.

It is another more specific object of the invention to provide a novel magnetic relay element coupled in combination to provide a novel magnetic symmetric logic tree having a plurality of disjoint outputs responsive to various combinations of a plurality of inputs.

Briefly, in accordance with one aspect of the invention there is provided a signal translating device comprising a magnetic relay component having a core material exhibiting remanence and low permeability at saturation for information storage. The relay component, which is analogous in its operation to an electrical relay, comprises first, second and third magnetic flux paths, one end of said first and second paths being joined at a first juncture and the other ends being coupled together by said third flux path to form a closed-path triangular configuration. The other ends also have outputs coupled thereto. A clockwise or counterclockwise flux is set up in said close-path by drive windings in accordance with an information input. The information is read out by a magnetomotive force which drives flux in a direction away from said juncture and causes a flux change in one of said first and second paths in accordance with the input information.

In accordance with a further aspect of the invention three magnetic relay components are cascaded wherein one of the outputs of the first component provides an input to the second component and the other output of said first component provides an input to the third component. A first information bit is applied to said first component and a second information bit is applied to said second and third components. In response to a readout magnetomotive force an output is obtained from one of several disjoint output paths coupled to said second and third components indicative of the applied information bits.

Although the features of the invention which are believed to be novel are set forth with particularity in the appended claims, the invention itself both as to its organization and method of operation, together with further objects and advantages thereof, may best be understood by reference to the following description taken in connection with the acompanying drawings wherein:

Figure 1:
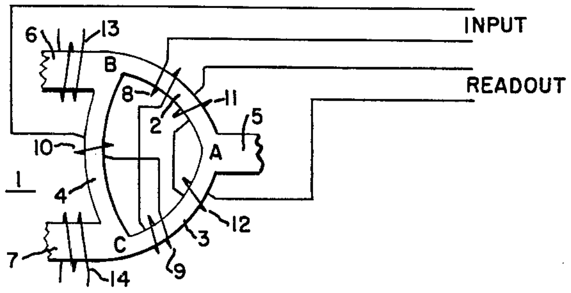
FIGURE 1 is a schematic diagram of applicant's novel magnetic relay element.

Referring to FIGURE 1, there is illustrated applicant's basic magnetic relay component 1 which is useful as a magnetic switch and which can be employed in various combinations for performing numerous complex binary logical operations. The component is information biased in one of two conditions so as to provide an output signal at one of two disjoint outputs in response to a readout signal. The network illustrated acts to steer flux changes through either a first or second path to one of the disjoint outputs in accordance with the input information in the same fashion as an electrical relay steers current.

The magnetic relay network illustrated comprises a continuous magnetic core structure in the form of first, second and third flux paths or legs 2, 3 and 4. The legs are shown to be of a curved construction so as to minimize flux leakage and facilitate the flux changes that must take place therein during the operation of the network. However, the legs may also be of straight-line construction. The core material is preferably a ferrite having a square loop hysteresis characteristic. However, the essential requirement of the material is that it exhibits remanence and has a low permeability at saturation, so that it may be possible to employ relatively poor square loop materials.

Leg 2 is joined to leg 3 at a first juncture A, and is joined to leg 4 at a second juncture B. Legs 3 and 4 are joined at a third juncture C. Thus, a local closed flux path is provided. An input leg 5 is connected to the juncture A, and output legs 6 and 7 are connected to junctures B and C, respectively. Legs 2 and 3 are of a first cross sectional area. The cross sectional area of leg 4 is at least said first cross sectional area. Legs 2 and 3 are of equal length and thus equal reluctance. Leg 4 is made greater in length than legs 2 and 3 so that unwanted flux changes will not take place within it. Junctures A, B and C and legs 5, 6 and 7 have a cross sectional area at least twice said first cross sectional area to accommodate the requisite flux changes that take place. When employing magnetic relay element 1 in a binary logic network, a closed flux path is provided through other comparable magnetic elements between output legs 6 and 7 and input leg 5.

Binary information is applied to the element 1 by input windings 8, 9 and 10 which are wound in the same direction about legs 2, 3 and 4, respectively. Readout windings 11 and 12 are wound about legs 2 and 3 in opposite directions. The windings may each have the same number of turns. The readout windings apply a readout pulse to element 1 so as to cause flux changes to occur in a direction from right to left. This provides an output in either of legs 6 or 7 in accordance with the input information. Output windings 13 and 14 are wound about output legs 6 and 7, respectively, to sense the output conditions. The readout windings 11 and 12 and the output windings 13 and 14 are unnecessary when the element is connected in a magnetic network wherein input leg 5 and output legs 6 and 7 are coupled to other stages of said network, as will be more readily understood when considering FIGURES 2 and 3. They are included here for purposes of explanation.

In the operation of the network of FIGURE 1, information of a "1" or "0" is applied to windings 8, 9 and 10. For purposes of illustration a "1" is applied by a positive pulse and will drive a saturation flux around legs 2, 3 and 4 in a clockwise direction. A "0" is applied by a negative pulse which drives a saturation flux around said legs in a counterclockwise direction. The readout pulse is always applied to the same direction, namely to drive flux in leg 2 from A to B and to drive flux in leg 3 from A to C. After a "1" has been applied to the input windings, which orients flux in a clockwise direction, a subsequent readout pulse causes a flux reversal in leg 2 but not in leg 3, leg 3 being driven further into saturation. This flux change also occurs in the output leg 6, providing a response in output winding 13. No flux change occurs in leg 4 since flux changes will always occur first in the shortest possible path. With a "0" applied to the input windings, it may readily be seen that an application of a readout pulse will cause a flux change in legs 3 and 7, with leg 2 being driven further into saturation. Again the flux in leg 4 is unaffected. Thus, it may be seen that a "1" input provides a response at disjoint output winding 13 and a "0" input provides a response at disjoint winding 14.

Leg 4 is required merely to provide a closed flux path for the input drive. In some applications it may be desirable to omit this leg or employ other flux paths which serve the same purpose, e.g., separate drive paths coupled in parallel with legs 2 and 3.

Figure 2:
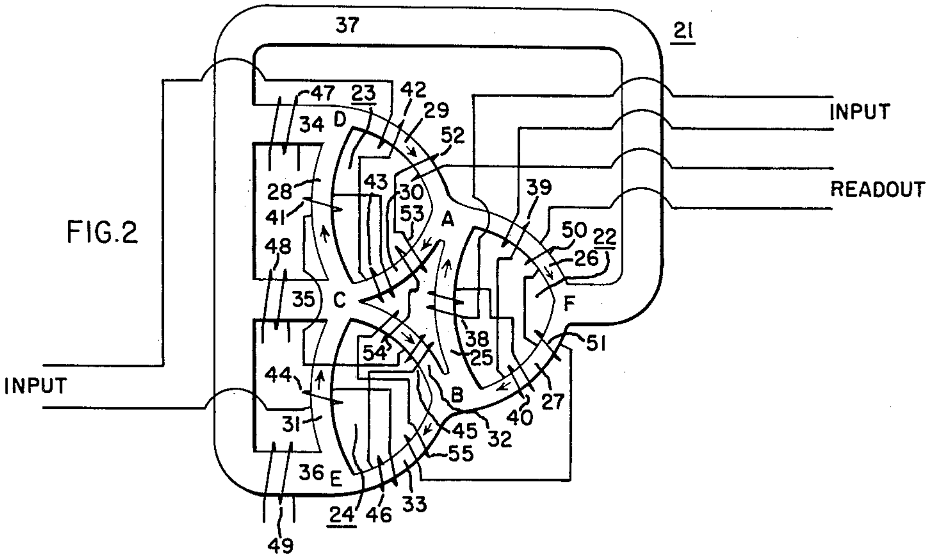
FIGURE 2 is a schematic diagram of applicant's symmetric magnetic logic tree network, which provides three disjoint outputs in response to various combinations of two inputs.

Referring to FIGURE 2 there is shown a two input symmetric logic tree network composed of three cascaded magnetic relay elements of the type illustrated in FIGURE 1. The network has three disjoint outputs providing a response to the presence of two "0" inputs, to the presence of a "1" input and a "0" input, and to the presence of two "1" inputs, respectively. The circuit acts to steer flux through various paths to a selected output in accordance with the input information. Input pulses of a "1" or "0" value are applied to input windings 38, 39 and 40 of a first input stage and to input windings 41, 42, 43, 44, 45 and 46 of a second input stage. The outputs are taken selectively from output windings 47, 48 and 49. Each of the output windings is responsive to a different combination of inputs. For example, with a "1" applied to each of the input stages, an output is obtained from winding 47. With a "1" applied to one of the input stages and a "0" to the other, an output is obtained from winding 48. A "0" applied to each of the input stages provides an output from winding 49.

The circuit comprises a unitary magnetic core structure 21 in the form of three magnetic relay elements 22, 23 and 24, each of the same basic construction as the element of FIGURE 1. Element 22, which represents the first input stage, comprises flux paths or legs 25, 26 and 27. Elements 23 and 24 represent the second input stage, element 23 comprising legs 28, 29 and 30, and element 24 comprising legs 31, 32 and 33. Legs 25, 26, 29 and 30 are joined at a single juncture A; legs 25, 27, 32 and 33 are joined at a single juncture B; and legs 28, 30, 31 and 32 are joined at a single juncture C. Outputs are taken from legs 34, 35 and 36. Leg 34 is joined to the juncture D of legs 28 and 29; leg 35 is joined to juncture C; and leg 36 is joined to the juncture E of legs 31 and 33. Return flux path or leg 37 couples the output legs 34, 35 and 36 to the juncture F of legs 26 and 27. Each of the recited legs 25 to 33 are of the same cross sectional area, and the junctures have twice said cross sectional area. Legs 34 to 37 also have twice said cross sectional area. The length of leg 37 is not critical being only as long as required to provide a flux return.

A first input pulse is applied to the first input stage by windings 38, 39 and 40, which are wound about legs 25, 26 and 27, respectively. A second simultaneous input pulse is applied to the second input stage by windings 41, 42, 43, 44, 45 and 46, which are wound about legs 28, 29, 30, 31, 32 and 33, respectively. The respective input pulses supply binary information of a "1" or "0" to their respective input stages. As before, a "1" is represented by a positive pulse and saturates the flux in a clockwise direction around the three legged magnetic relay elements, and a "0" is represented by a negative pulse which saturates the flux in a counterclockwise direction around said elements. A first output winding 47 is wound about leg 34; a second output 48 is wound about leg 35; and a third output winding 49 is wound about leg 36. Readout windings 50 to 55 are wound about legs 26, 27, 29, 30, 32 and 33, respectively, and are energized to drive flux in a direction from right to left which allows the information stored in said first and second stages to be read out from the output windings. Outputs will appear at the respective output windings for various applied inputs in the order previously described.

In the operation of the circuit, it will be assumed that a "1" is applied by windings 38, 39 and 40 to the first input stage and a "1" is applied by windings 42 to 46 to the second input stage. The positive pulse applied to windings 38, 39 and 40 will drive flux in a clockwise direction around element 22 and the positive pulse applied to windings 42 to 46 will drive flux in a clockwise direction around elements 23 and 24. Thus, the flux orientation in the flux paths of the core device will be as illustrated in FIGURE 2. The application of a pulse by readout windings 50 to 55, which tends to drive the flux from right to left, will reverse the flux in legs 26 and 29, thereby driving the flux in a closed-path through legs 26, 29, 34 and 37 to provide an output response from winding 47. Flux is prevented from flowing in any other path because of the saturation state of the various legs. Assuming now that a "1" input is applied by windings 38, 39 and 40 to the first input stage and a "0" is applied by windings 42 to 46 to the second input stage, flux will be oriented in a clockwise direction around element 22 and in a counterclockwise direction around elements 23 and 24. The application of a readout pulse by windings 50 to 55 will then drive flux through a path including legs 26, 30, 35 and 37, providing an output response from winding 48. With a "0" input applied to the first input stage and a "1" applied to the second input stage, a flux pattern will be established so that the readout pulse will drive flux through a path including legs 27, 32, 35 and 37, and again will provide an output from winding 48. By the application of a "0" input to each of the input stages, the flux will be oriented around each of elements 22, 23 and 24 in a counterclockwise direction and a readout pulse will drive flux through a path including legs 27, 33, 36 and 37. Thus, an output will be provided from winding 49 indicative of two "0" inputs. It may be appreciated that additional input stages may be readily added with each successive input stage having an additional circular element so that outputs may be provided from the combination of a large number of inputs.

Figure 3:
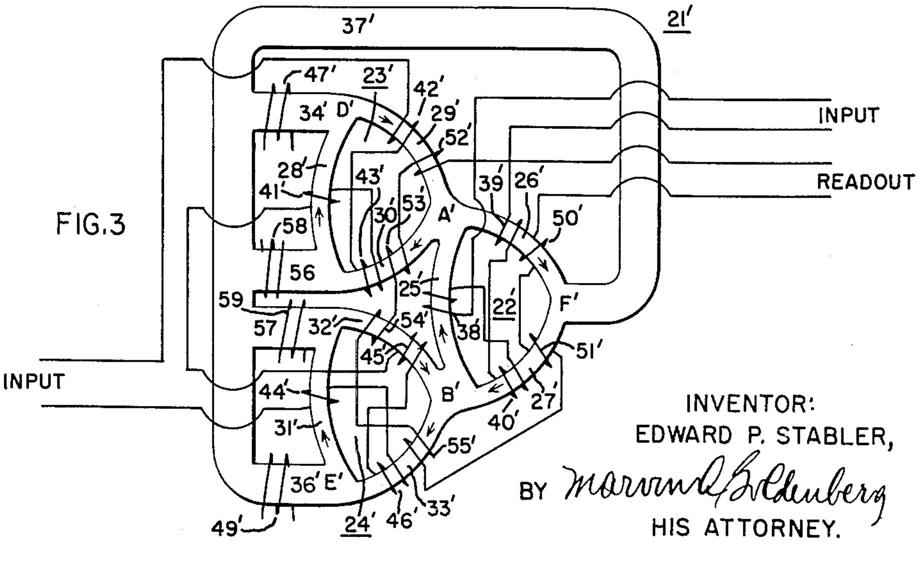
FIGURE 3 is a schematic diagram of applicant's magnetic logic tree network, which provides four disjoint outputs responsive to various combinations of two input signals.

Referring now to FIGURE 3, there is illustrated a two input magnetic logic tree having four disjoint outputs. The network is similar to that of FIGURE 2 and similar components are designated with similar primed notations. The network differs from that of FIGURE 2 in that separate output legs 56 and 57 are coupled to the juncture of legs 28′ and 30′, and 31′ and 32′, respectively. Legs 56 and 57 have a cross sectional area equal to that of legs 34′ and 36′, and are connected to leg 37′. Output winding 58 is wound about leg 56 and is responsive to a "1" applied to the first input stage and "0" applied to the second input stage. Output winding 59 is wound about leg 57 and is responsive to a "0" applied to the first input stage and a "1" applied to the second input stage. The operation of the circuit is otherwise the same as that of FIGURE 2.

It should be recognized that although only a few specific magnetic binary logic configurations utilizing applicant's magnetic relay component have been described, numerous other configurations may be devised without exceeding applicant's teaching. In fact, as stated previously, essentially all binary logical operation can be performed using applicant's basic component.

In addition, it is obvious that various modifications may readily be made to applicant's specific disclosure by skilled artisans. For example, the legs of the magnetic elements alternatively may be of circular or straight-line construction. The dimensions thereof may be varied. The input windings and readout windings may be wound in a manner other than shown. Further, the inputs and the readout magnetomotive force may be applied along magnetic paths.

The appended claims are intended to include modifications which fall within the true spirit and scope of the invention.

What I claim as new and desire to secure by Letters Patent of the United States is:

1. A signal translating device of a magnetic core construction wherein said core exhibits remanence plus low permeability at saturation comprising first and second flux legs of equal cross sectional area having one end coupled together at a juncture, the other ends of said first and second flux legs being coupled to said juncture by a return flux path, information means for applying a magnetomotive force to said first and second legs so as to drive flux in one of said legs in a direction towards said juncture and to drive flux in the other of said legs in a direction away from said juncture, readout means for applying a magnetomotive force to said first and second legs so as to drive flux in both of said legs in the same direction with respect to said juncture to provide a flux change in one of said legs and means associated with each leg for obtaining an output indicative of the leg in which said flux change occurs.

2. A signal translating device of a magnetic core construction wherein said core exhibits remanence plus low permeability at saturation comprising first and second flux legs of equal cross sectional area having one end coupled together at a juncture, the other ends of said first and second flux legs being coupled to said juncture by a return flux path, means for selectively orienting the flux in said first and second legs in accordance with an input signal, means for causing a flux change in only one of said first or second flux legs in accordance with the preset flux orientation, and means associated with each of said first and second legs for obtaining an output in response to said flux change.

3. A signal translating device of a magnetic core construction wherein said core exhibits remanence plus low permeability at saturation comprising first, second and third flux paths, one end of said first and second paths being coupled together at a first juncture, said third flux path joining the other ends of said first and second paths at a second and third juncture respectively thereby forming a closed-path, said second and third junctures being coupled to said first juncture by a return flux path, information means for driving flux around said closed-path in one of two directions thereby storing an information bit in said closed-path, readout means for driving flux in said first and second paths in the same direction with respect to said first juncture thereby causing a flux change in one of said first or second paths in accordance with the stored information bit and means responsive to a flux change in each of said first and second paths for obtaining an output indicative of the information applied.

4. A signal translating device as in claim 3 wherein said first and second flux paths are of equal cross sectional area.

5. A signal translating device of a continuous magnetic core construction having a core material exhibiting a substantially square loop characteristic comprising first, second and third cascaded magnetic relay elements, each element having first and second flux paths, one end of the first and second flux paths of said first element being coupled together at a first juncture, the other end of the first flux path of said first element and one end of the first and second flux paths of said second element being coupled together at a second juncture, the other end of the second flux path of said first element and one end of the first and second flux paths of said third element being coupled together at a third juncture, the other ends of the first and second flux paths of said second and third elements being coupled to said first juncture by a return flux path, means for selectively orienting the flux in each of said first and second flux paths in accordance with an input information, means for causing a flux change in one of said first and second flux paths of said first element and in one of said first and second paths in one of said second and third elements in accordance with the preset flux orientation and means associated with each of said first and second flux paths of said second and third elements for obtaining an output in response to said flux change.

6. A signal translating device as in claim 5 wherein said means for obtaining an output comprises disjoint first, second and third output paths which form a portion of said return flux path, said first output portion being coupled to the other end of the first flux path of said second element, said second output portion being coupled to a common juncture of the other end of the second flux path of said second element and the other end of the first flux path of said third element, and said third output portion being coupled to the other end of the second flux path of said third element.

7. A signal translating device as in claim 5 wherein said means for obtaining an output comprises disjoint first, second, third and fourth output paths which form a portion of said return flux path, said first portion being coupled to the other end of the first flux path of said second element, said second output portion being coupled to the other end of the second flux path of said second element, said third output portion being coupled to the other end of the first flux path of said third element, and said fourth output portion being coupled to the other end of the second flux path of said third element.

8. A signal translating device as in claim 5 wherein each of said first, second and third relay elements has a third flux path coupled between the other ends of said first and second flux paths to form three closed flux paths.

9. A signal translating device as in claim 8 wherein said means for selectively orienting the flux includes an information input means for driving flux in one of two directions in each of said closed-paths thereby storing a first information bit in said first relay element and a second information bit in said second and third relay elements and wherein said means for causing a flux change includes a readout means for driving flux in said first and second paths in the same direction with respect to said first, second and third junctures.

References Cited in the file of this patent

UNITED STATES PATENTS

| | | |
|---|---|---|
| 2,818,555 | Lo | Dec. 31, 1957 |
| 2,868,451 | Bauer | Jan. 13, 1959 |
| 2,955,212 | Mallery | Oct. 4, 1960 |